(12) United States Patent
Alber et al.

(10) Patent No.: US 10,407,328 B2
(45) Date of Patent: Sep. 10, 2019

(54) METHOD TO CONTROL A PROCESS VARIABLE

(71) Applicant: Endress + Hauser Conducta Gesellschaft für Mess- und Regeltechnik mbH + Co. KG, Gerlingen (DE)

(72) Inventors: Thomas Alber, Stuttgart (DE); Christoph Herb, Wiernsheim (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 672 days.

(21) Appl. No.: 14/968,115

(22) Filed: Dec. 14, 2015

(65) Prior Publication Data

US 2016/0167992 A1    Jun. 16, 2016

(30) Foreign Application Priority Data

Dec. 15, 2014    (DE) .................. 10 2014 118 618

(51) Int. Cl.
  *C02F 3/00*   (2006.01)
  *C02F 3/12*   (2006.01)
  *G05B 19/042* (2006.01)

(52) U.S. Cl.
  CPC ............ *C02F 3/006* (2013.01); *C02F 3/12* (2013.01); *G05B 19/042* (2013.01); *C02F 2209/005* (2013.01); *C02F 2209/38* (2013.01)

(58) Field of Classification Search
  CPC ...... C02F 3/006; C02F 3/12; C02F 2209/005; C02F 2209/38; G05B 19/042

(Continued)

(56) References Cited

U.S. PATENT DOCUMENTS

| 5,268,630 | A | * | 12/1993 | Bhagwat | H02J 7/0081 320/145 |
| 6,146,896 | A | * | 11/2000 | Pilz | C02F 3/006 210/601 |
| 2004/0112829 | A1 | * | 6/2004 | Jenkins | C02F 3/006 210/614 |

FOREIGN PATENT DOCUMENTS

| CN | 100522838 C | 8/2009 |
| DE | 19640333 A1 | 4/1998 |

* cited by examiner

*Primary Examiner* — Thomas C Lee
*Assistant Examiner* — Alan Chu
(74) *Attorney, Agent, or Firm* — Kelly J. Smith; PatServe

(57) ABSTRACT

A method to control a process variable in a process by means of a control unit comprises: sequential determination of values of a reference variable to be supplied to the first control unit based on the values of a first measurand; sequential determination of values of a regulating variable using both values for the reference variable and sequentially determined values for the process variable; with a current value for the reference variable being determined: by sequentially saving values of the first measurand, or values derived therefrom, in a first FIFO memory having a number K of memory locations for saving one value respectively, namely a memory featuring a number K of logically consecutive memory locations (j=i) in such a way that the oldest of the values saved in the first FIFO memory is saved in a first memory location (j=1) and the value saved last in the first FIFO memory is saved in a final memory location (j=k); and by using only the n oldest values saved in the first FIFO memory to determine the current value for the reference variable, with n being a number of values that is smaller than the number K of the values saved in the memory locations of the first FIFO memory and greater or equal 1.

20 Claims, 1 Drawing Sheet

(58) Field of Classification Search
USPC .......................................................... 700/11
See application file for complete search history.

METHOD TO CONTROL A PROCESS VARIABLE

TECHNICAL FIELD

The invention concerns a method to control a process variable in a process by means of a control unit.

BACKGROUND DISCUSSION

Control units are used in a large variety of processes in process metrology in order to control process variables. Controls in processes with considerable, and especially variable downtimes face particular requirements.

Such a situation may occur, for example, in the field of wastewater treatment and/or water purification. The processes conducted in wastewater treatment plants to treat liquids, e.g. water containing sludge, are usually characterized by slow flow velocities of the liquid to be treated.

In the following, this is illustrated in more detail on the basis of several specific processes in the field of wastewater treatment. The basic problem definition as well as the solution according to the invention described below are, however, transferable to the control of process variables in other processes with downtime characteristics, especially to processes to treat liquids.

The purification of wastewater in wastewater treatment plants usually includes the elimination of nitrogen, organic compounds and phosphate. For this reason, activated sludge processes, also referred to as aeration processes, are employed that contain a biological wastewater purification process. In these processes, the substances to be degraded are converted by microorganisms, and the content of such substances in the wastewater is thus reduced. Activated sludge processes allow the conversion and/or degradation of organic substances and nitrogen compounds. For example, by means of an activated sludge process, the chemical oxygen demand (COD), the biochemical oxygen demand (BOD) and nitrogen compounds (ammoniacal nitrogen content) may be lowered. One measure for the content of organic compounds in a liquid is also the SAC parameter (spectral absorption coefficient), which states the absorption and/or extinction of radiation of one or several wavelengths, especially the extinction of radiation with the wavelength 254 nm in relation to 1 m of the penetrated liquid. It is possible to use one or several further wavelengths as reference. A reduction of organic compounds with an activated sludge process thus consequently leads to a reduction of the SAC.

In an activated sludge process, the traditional degradation of nitrogen occurs, for example, by means of the processes of nitrification and denitrification. The term nitrification refers to the bacterial oxidation of ammonium to nitrate. Denitrification is understood to be the conversion of the nitrogen contained in the nitrate to molecular nitrogen by bacteria called denitrificants. While the nitrification process requires an oxygen supply for oxidation of the nitrogen compounds, the denitrification process has to be conducted under anoxic conditions, wherein the denitrificants must have sufficient supply of oxidizable substances available. Two different types of methods have primarily been established, which both allow the realization of these different conditions for the two processes, namely continuous methods and intermittent methods. In a continuous method, the denitrification is conducted in a first tank, the denitrification tank, and the nitrification in a second tank, the nitrification tank, wherein the two tanks may also be further subdivided. The denitrification tank is operated anoxically while the nitrification tank is supplied with air through an aerator. The liquid in the nitrification tank is partly pumped back into the denitrification tank ("internal recirculation") to continue the conversion of nitrate formed during the nitrification process into nitrogen. The remaining part of the nitrification tank effluent flows on to secondary treatment. In intermittent methods, nitrification and denitrification are completed in a single tank, with the tank intermittently being aired by means of an aerator that is turned on and off.

The first automated wastewater treatment plants worked purely time-controlled with intermittent methods. For continuous methods, the aeration in the nitrification tank was operated permanently or was controlled via a timer. Later on, controls and means of controlling the aeration became known that were based on the measurement of the concentration of dissolved oxygen or the redox potential of the liquid to be treated. More recently, online-capable sensors for the ammonium and nitrate measurements have become known, so that now an observation of the ammonium and nitrate concentration in real-time and thus also controls based on such ammonium and nitrate measurements have become possible.

Since in a continuous method the liquid to be treated flows through the treatment tanks, it follows that a measuring point used to determine a control variable is arranged downstream of the aeration in flow direction. For an intermittent method, too, measuring points for dissolved oxygen or ammonium usually are arranged inside the tank in the area of the fluid discharge or even directly in the tank drain. This has the disadvantage that load variations of the nitrogen compounds to be degraded are only captured, i.e. "noticed", by the control unit when they have arrived at the measuring point. Any load fall thus leads to too much air being supplied into the tank. The associated energy consumption is thus higher than necessary. If a load rise is noted only in the area of liquid discharge, aeration cannot be activated quickly enough to provide sufficient oxygen for the nitrification process in order to degrade the entire nitrogen or organic load. In such cases, there is a danger that outlet threshold values are exceeded. In adverse load variation cases, it may also happen that the controls start to build up and/or swing.

A regulation or control of the aeration based on load prognoses that take into account expected load variations e.g. on the basis of known diurnal variation is conceivable, but cannot be realized easily. One of the reasons for this is that the nitrogen load to be degraded is influenced by a variety of effects that are difficult to forecast, such as, for example, weather influences or irregular discharge of industrial wastewater in the catchment area of the wastewater treatment plant.

There are further considerations of capturing measuring values in the intake area of the wastewater treatment plant, before the aeration tank and/or nitrification tank and use them as regulating variables for the aeration. Any modification of the measuring values that are considered for the determination of the regulating variable for the aeration, however, is only included at the place of the aerator with a certain delay that depends on the flow velocity of the liquid to be treated. It is therefore not possible with the methods known from the current state of the art to adjust the aerator very precisely to provide aeration that is adjusted as exactly as possible to the load of substances to be degraded found in the liquid that is in the aeration tank near the aeration area at that moment.

SUMMARY OF THE INVENTION

The invention therefore has the purpose to describe a method to control a process variable in a process, especially a process with downtime characteristics, by means of a control unit that avoids the disadvantages of the current state of the art.

This task is solved by a method to control a process variable in a process by means of a first control unit according to the invention comprises:

sequential determination of values of a reference variable to be supplied to the first control unit based on the values of a first measurand;

sequential determination of values of a regulating variable, which is an output of the control unit, using both values for the reference variable and sequentially determined values for the process variable;

with a current value for the reference variable being determined:

by sequentially saving values of the first measurand, or values derived therefrom, in a first FIFO memory having a number K of memory locations for saving one value respectively, namely a memory featuring a number K of logically consecutive memory locations (j=i) in such a way that the oldest of the values saved in the first FIFO memory is saved in a first memory location (j=1), i.e. in the memory location to be read first and the value saved last in the first FIFO memory is saved in a final memory location (j=k);

and by using only the n oldest values saved in the first FIFO memory to determine the current value for the reference variable, with n being a number of values that is smaller than the number K of the values saved in the memory locations of the first FIFO memory and greater or equal 1.

A FIFO memory with a given number K of logically consecutive memory locations refers to a FIFO memory realized as hardware or a combination of hardware and software whose memory locations can be identified, for example by means of indexing, in such a way that they can be read consecutively, i.e. in an order determined by the indexing. The values saved in the memory locations can be numeric values in particular.

If every memory location contains exactly one value, the n values being used for the respective current value of the reference variable to be supplied to the first control unit are those values saved in the memory locations j=1 to j=n, with j being an index assigned to a respective memory location that determines the logical sequence of the memory locations. The number n then equals the number of the memory locations of the first FIFO memory that are read to determine the current value of the reference variable, with n being smaller than the number K of memory locations and greater than or equal 1. In other words: The values saved in the memory locations j=1 to j=n are read to determine the current value of the reference variable, wherein 1≥n<k.

The current values of the first measurand used for determining the reference variable for the first control unit are saved in the first FIFO memory, but are not used immediately after saving to determine a current value for the reference variable since only the oldest n values are used for the value of the reference variable determined at a certain point in time. As shall be described in more detail below, it is possible to set the timing with which a new value is saved to the FIFO memory and the respective oldest value is deleted from the FIFO memory in such a way that each value only belongs to the n oldest values saved in the first FIFO memory and used for determining the reference variable after a delay corresponding to the downtime behavior of the process. The timing may especially depend on a further measurand, for example a volume flow of a process medium in a process. This procedure at any given time provides a nominal value or a reference variable to the control unit that corresponds to the actual occurring process conditions and represents the process conditions respectively. By taking several sequentially determined values of the first measurand into account, short-term peaks in the measurand are attenuated.

In one embodiment, the sequential determination of values for the reference variable to be provided to the first control unit comprises:

the determination of values of a second measurand that differs from the first measurand, with the former being used to determine the reference variable of the first control unit.

This allows the determination of the current value for the reference variable:

by saving values of the second measurand, or values derived therefrom, in a second FIFO memory having a number N of memory locations for saving one value respectively, namely a memory featuring a number N of logically consecutive memory locations (h=i), and by using all the values saved in the second FIFO memory to determine the current value for the reference variable, with N being a number of values that is equal to the number n of the values saved in the first FIFO memory and used for determining the current value of the reference variable.

The second measurand may be the process variable supplied to the first control unit as the control variable.

In one preferred embodiment, new values are saved or deleted and/or overwritten at the same time in the first and second FIFO memory, with the point in time being determined by a timing that depends on a further measurand.

When a new value is saved to the first FIFO memory, the respective oldest value saved in the FIFO memory is deleted or overwritten. The second FIFO memory is timed synchronically with the first FIFO memory in such a way that the value contained in a first memory location of the logically consecutive locations in the second FIFO memory, i.e. the one to be read first, is deleted.

This process may, for example, be a process to treat a liquid, especially for the biological degradation of one or several substances to be degraded in that process, which is conducted in a container that has a fluid intake and a fluid discharge, with the first control unit being an air-mass flow control unit to adjust an aerator that serves to supply air into a fluid volume of the liquid found in the container, wherein the process variable is an air volume fed into the fluid volume, wherein the reference variable to be supplied to the first control unit is a nominal value of the air volume to be fed into the fluid volume, and wherein the regulating variable is a variable for the aerator, especially a pump capacity or rotational speed that influences the air volume fed into the fluid volume, i.e. the process variable, and wherein the first measurand represents a load of one or several substances to be degraded in the process and found in a given volume unit of the liquid in the fluid intake.

In this embodiment, the values of this first measurand or air requirement values derived from at least one value of the first measurand using a proportionality factor can be saved sequentially into the first FIFO memory, wherein each air requirement value represents an air volume to be fed into the liquid in order to degrade the substance load represented by the at least one value of the first measurand.

In order to determine each air requirement value, several values for the first measurand and a throughput, e.g. a volume flow or a mass flow, of liquid may be captured sequentially, especially at a measuring point arranged upstream from the liquid intake or in the liquid intake, with the sequentially captured values for the first measurand or values derived therefrom being accumulated until the throughput reaches a selectable threshold value for the throughput that corresponds to a certain fluid volume, and wherein the air requirement value is determined by the accumulation value resulting from the accumulation of values of the first measurand. The air requirement value may in particular be determined from the accumulation value and the already mentioned proportionality factor.

The values for the first measurand may be derived from measuring values that are, for example, captured by a sensor, in particular a ion-selective electrode, an automatic analysis device or a SAC probe and represent a concentration of one or several substances to be degraded, and from throughput measuring values for the liquid captured simultaneously by a flow sensor. The throughput measuring values also serve to determine the point when the settable throughput threshold value has been reached. The throughput values may be captured at the same measuring point as the values for the first measurand, or at another measuring point that is spaced apart from the former. The measuring signals from the sensor and the flow sensor are provided to a superior control unit that processes the measuring signals and uses them to determine current values for the reference variable according to the method described here.

The air requirement value determined last at any point may be saved to a memory location in the first FIFO memory, while simultaneously the oldest air requirement value saved in the first FIFO memory is deleted or overwritten.

The values for the first measurand may, as mentioned before, be captured at a measuring point arranged in the fluid intake, wherein the settable throughput threshold value equals the quotient of the volume taken up by the liquid found between the measuring point and the fluid discharge, and the number K of the memory locations of the first FIFO memory, so that each memory location corresponds to a liquid volume unit flowing into the container by way of the fluid intake, and the air requirement value saved in that memory location represents the air volume to be supplied into the liquid in order to degrade the load contained in this liquid volume unit. The size of the volume unit or the throughput threshold value may be set, e.g. depending on the container dimensions and/or the liquid intake.

This makes the time passing between the saving of individual, newly determined air requirement values in the first FIFO memory dependent on the throughput of the liquid through the fluid intake and/or through the container in which the process takes place. Saving new and simultaneously deleting old air requirement values in the first FIFO memory therefore occurs with a timing that depends on the current throughput of liquid through the fluid intake and/or the container. Saving a new air requirement value and deleting the respective oldest air requirement value makes all the existing air requirement values already saved in the first FIFO memory move up one position in the order determined by the logically consecutive memory locations in the first FIFO memory. Moving up individual values saved in the first FIFO memory in the given order therefore simulates the transport of the liquid volume unit corresponding to the respective value and/or memory location.

In order to determine the current value of the reference variable to be supplied to the control unit, i.e. a nominal value for the air mass flow to be fed into the fluid volume, the n oldest air requirement values saved in the first FIFO memory can be added to obtain a total air requirement value, wherein the number n of the air requirement values used for the total air requirement value is selected in such a way that the sum of the liquid volume units corresponding to the respective memory locations is equal to the volume of the container containing the liquid. In this case, the total air requirement value indicates exactly the original air requirement not yet provided of the fluid volume found in the container at a given moment.

The second measurand mentioned above may represent an air volume, especially an air mass flow, fed into the liquid in the container by means of the aerator in case the process is a process to treat a liquid, especially to biologically degrade one or several substances contained in the liquid, wherein air introduction values are determined from several sequentially captured values of the second measurand by accumulating the sequentially captured values of the second measurand or values derived therefrom until the liquid throughput detected for the simultaneous determination of an air requirement value has reached the settable throughput threshold value, and the air introduction values are determined by accumulation values obtained by the accumulation of the values of the second measurand or the values derived therefrom.

In this, the values derived from the values of the second measurand may be air volume percentage values that are calculated by the division of values of the second measurand by the number of memory locations of the second FIFO memory. These air volume percentage values are accumulated until the settable throughput threshold value is reached, and current air introduction values are determined from the accumulation values determined in this way and the air introduction values already saved in the memory locations of the second FIFO memory.

At the same time that a newly determined air requirement value is saved, and the oldest air requirement value in the first FIFO memory is deleted, the air introduction value saved in the second FIFO memory at a memory location that is to be read first according to the logical sequence of the memory locations (h=1) is also deleted. This deletion hence occurs at the same speed depending on the throughput as in the first FIFO memory. Analogous to the air requirement values saved in the first FIFO memory, the air introduction values saved in the second FIFO memory move up one position in the sequence defined by the logically sequenced memory locations. The speed with which they do so depends on the throughput of the liquid through the container. The air introduction value contained in the final memory location (h=n) according to the logical sequence of the memory locations is simultaneously set to zero. Then, the air volume percentage values are once more determined and accumulated until the throughput threshold value is reached, as described above.

In order to obtain the current value of the reference variable to be supplied to the first control unit, i.e. a nominal value for the air volume fed into the liquid volume, all air introduction values saved in the second FIFO memory can be added to obtain a total air introduction value.

In order to determine the current value for the reference variable, a deviation value representing the deviation of the total air requirement value from the total air introduction value can be determined.

In one advantageous embodiment, values for a third measurand may be determined sequentially, which represent the remaining quantity discharged from the tank via the fluid discharge of the substance or the substances to be degraded in the process, or a dissolved oxygen content found in the liquid in the container. Preferably, the third measurand corresponds to the first measurand.

The values of the third measurand may be used for the values of the reference variable. The values for the reference variable provided to the first control unit, e.g. the air-mass flow control unit, may consequently be determined from the air requirement values obtained on the basis of the first and second measurand and on the basis of further nominal values derived from the values of the third measurand. It is basically possible that further contributions are made to the values for the reference variable provided to the first control unit.

The nominal values derived from the values of the third measurand and used for the values of the reference variable to be supplied to the first control unit may be determined by means of a second control unit. The second control unit may especially be an output control unit that is provided with the values of the third measurand captured downstream from the fluid discharge, and which compares the reference variable values with a nominal value, preferably a set value serving as the reference variable for the second control unit and then determines, based on this comparison, values for the air volume to be fed into the container and serving as regulating variable for the second control unit. These values for the regulating variable determined by the output control unit contribute to the values of the reference variable supplied to the first control unit in addition to the deviation values mentioned above, which represent a deviation between the total air introduction value and the total air requirement value.

In one embodiment of the method, air requirement values derived from at least one value of the first measurand using a proportionality factor are saved sequentially in the first FIFO memory, as described above. The proportionality factor in this embodiment may be adapted on the basis of at least one measuring value of the third measurand captured in the discharge or downstream of the discharge, especially in settable time intervals.

The proportionality factor may be adapted by
determining a load of substances to be degraded added to the process in a predefined time period from measuring values for the first measurand captured at the intake or upstream from the intake during this time period,
determining the load of substances to be degraded that leaves the process by the discharge in this time period from measuring values for the third measurand captured at the discharge, and
wherein deviation values are determined which represent a deviation from the load of substances to be degraded added to the process from the load of substances to be degraded that leave the process at the discharge; and
wherein the deviation values and values for the air volume introduced into the container in the given time period are used to adjust the proportionality factor.

The invention also includes an apparatus to execute the method according to one of the embodiments above, comprising:
at least one first measuring unit serving to determine values for the first measurand and arranged in the fluid intake;
an electronic control unit connected with the first measuring unit to receive the measuring values from the first measuring unit, which comprises an operating software serving the method according to at least one of the embodiments described above.

BRIEF DESCRIPTION OF THE DRAWINGS

The invention is in the following explained in further detail on the basis of the exemplary embodiments shown in the figures. They show.

DETAILED DISCUSSION IN CONJUNCTION WITH THE DRAWINGS

Figure 1:
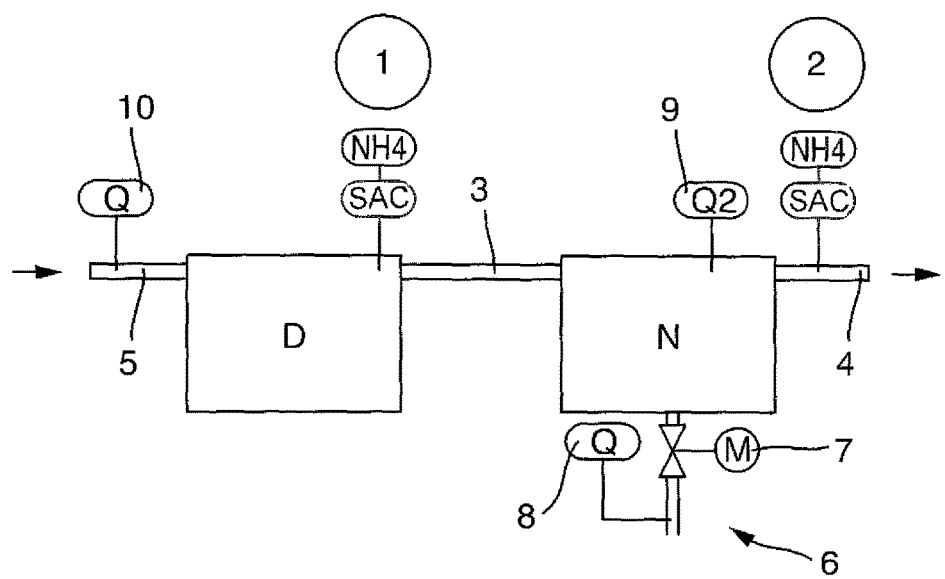
FIG. 1 is a schematic representation of a plant for conducting an aeration process.

FIG. 1 shows a schematic representation of a plant to degrade ammonium and nitrogenous organic compounds in a liquid. It includes a denitrification tank D and a nitrification tank N. The denitrification tank D and a first fluid line 3 are arranged upstream of the nitrification tank N with regard to the flow direction of the liquid and thus form the fluid intake for the nitrification tank N. Another fluid line 4 forms the liquid discharge of the nitrification tank. The liquid discharge is connected with the denitrification tank D via its intake 5 by a recirculation line (not shown). The liquid to be treated (especially wastewater) flows through the plant in the flow direction from the denitrification tank D to the nitrification tank N (arrows).

The nitrification tank N is filled with a liquid containing activated sludge and water. The activated sludge includes microorganisms that serve to convert ammonium to nitrate and thus reduce or degrade the ammonium content in the liquid. The liquid contained in the nitrification tank N may be supplied with air via an aerator 6 in order to guarantee sufficient oxygen supply for the microorganisms. The throughput, or a throughput rate for the air supplied into the nitrification tank N, may be adjusted via a controlled or regulated setting device 7. By means of a flow sensor 8 arranged in the air supply line to the nitrification tank, throughput measuring values, especially mass flow measuring values for the air fed into the nitrification tank may be captured. Upstream from the nitrification tank N, there is a first measuring point 1 where values for the ammonium concentration NH4 found in the liquid present at the first measuring point 1 as well as SAC values for the liquid present at the first measuring point 1 are captured. It is basically also possible to determine only one of the measurands SAC or ammonium concentration. Measuring values for the ammonium concentration may, for example, be captured at the first measuring point 1 by means of an ion-selective ammonium electrode. SAC values may be captured with a photometric or spectrometric SAC probe. Such ion-selective electrodes and SAC probes are sufficiently known in the current state of the art.

Downstream behind the fluid discharge 4 of the nitrification tank N, there is a second measuring point 2 that serves to capture measuring values of an ammonium concentration NH4 and SAC values of the liquid. A sensor for dissolved oxygen 9 may optionally be arranged in the nitrification tank N itself.

The plant furthermore also includes a flow sensor 10 that captures throughput values, especially volume flow values of the liquid through the plant shown in FIG. 1. It is possible to arrange several flow sensors 10 at different points within the plant, especially in order to capture different liquid influxes to the denitrification tank N.

All sensors are connected with a superior control unit in order to supply measuring signals to said control unit. The control unit comprises an electronic data processing unit, e.g. a programmable logic controller, a computer, a process automation controller, a measuring transducer with regulating and/or control functions, or a control unit of an automatic analysis device. The control unit is also connected with the setting device 7 for control and regulation as well as the activation of the aerator 6 in order to allow the control unit to control and/or regulate the setting device 7 and thus the aerator 6 by using some or all of the measuring signals received from the sensors. For this purpose, the control unit comprises an operating program serving to control and/or regulate the aerator 6 and/or the setting device 7.

Figure 2:
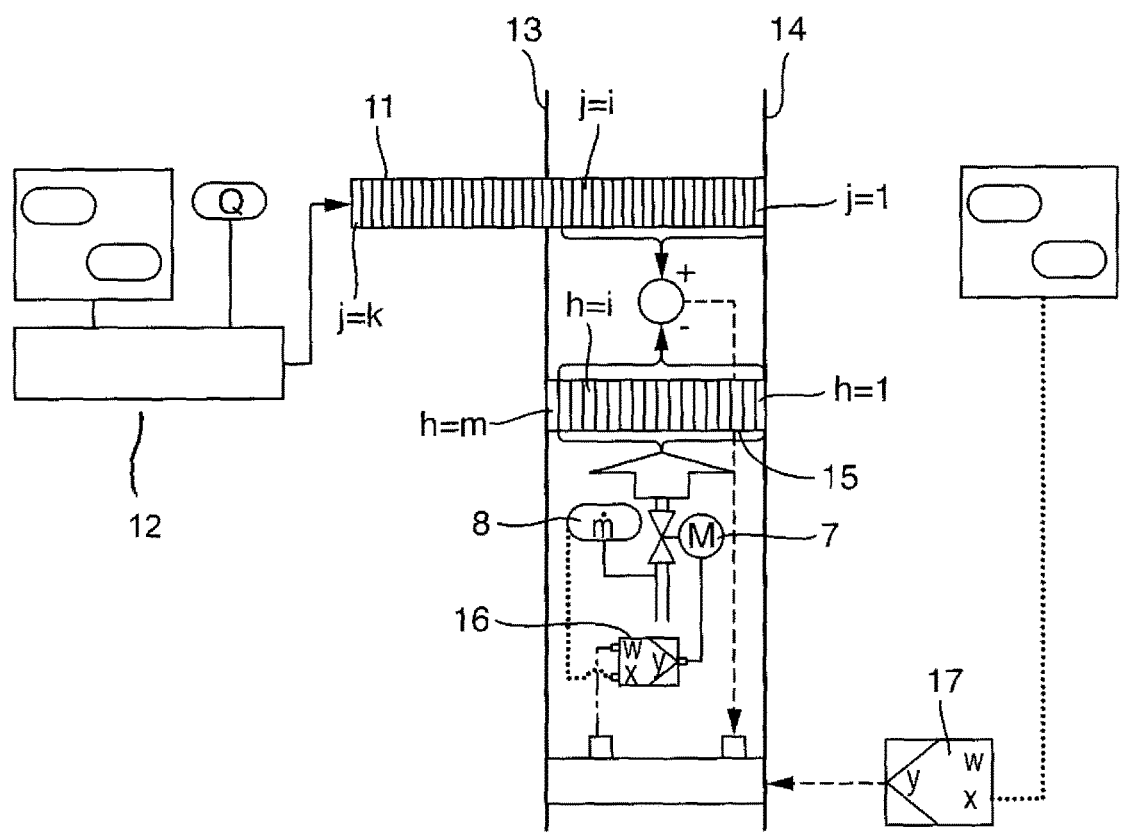
FIG. 2 is a schematic block diagram of the aeration control in an aeration process.

A method to control the aerator 6 in the plant schematically represented in FIG. 1 shall now be described on the basis of FIG. 2. Although this method is described here on the basis of a continuous nitrification process, it may similarly be used for processes in which the aerator is operated intermittently. Similarly, the method may be transferred to activated sludge processes that serve to degrade hydrocarbons and phosphoric compounds.

The control unit receives the values for ammonium concentration or SAC captured at the measuring point 1. These values serve to calculate a load of substances to be degraded, for example, an ammonium nitrogen load NH4-N to be degraded in a certain volume of the liquid to be treated while taking the throughput of the liquid captured by the flow sensor 10 into account. This measurand serves to determine the air required in the liquid to be treated. In the following, only the ammonium concentration and the ammoniacal nitrogen load NH4-N that can be derived therefrom is taken as an example. Basically, however, both variables may be used to determine the air requirement to control the aerator. A proportionality factor α allows an air requirement value to be determined from the ammoniacal nitrogen load of a certain volume unit of the liquid, which represents the air mass to be fed into the nitrification process to degrade said ammoniacal nitrogen load in the process. The determination of this value is represented by block 12 in the diagram shown in FIG. 2.

At the time the measuring values used for the determination of the air requirement value are captured, the liquid volume with the ammoniacal nitrogen load corresponding to the air requirement value is still at the position of measuring point 1. Due to the slow flow velocity of the liquid through the plant, the time period until this fluid volume enters the nitrification tank N may be in the range of one or several hours. In order to ensure that at the time this fluid volume enters the nitrification tank N, an air volume that corresponds to the air requirement value is fed into the nitrification tank N, the control unit comprises a first FIFO memory 11 with which the flow of the liquid containing the ammoniacal nitrogen load NH 4 -N through the plant can be simulated, and a second FIFO memory 15 which can at any time be used to determine the total air volume already added to the fluid volume contained in the nitrification tank N.

The first FIFO memory 10 comprises a number K of memory locations j=1, ..., j=i, ..., j=1, in which one air requirement value each may be stored. The memory locations of the first FIFO memory 10 are designed to be read in a logical sequence determined by the corresponding value of the index j. In this example, the oldest value saved in the first FIFO memory 10 is saved in the memory location j=1, the most recently saved value in the memory location j=k. If a new value is written to the first FIFO memory 10, it is saved to the memory location j=k while at the same time the oldest value saved at the memory location j=1 is deleted. All other values move up to the memory location with the next higher index in the order prescribed by the indexes of the memory locations j=i, which means that the oldest value now is once again saved at the memory location j=k.

Each memory location has a share of the volume filled with liquid between the first measuring point 1 and the discharge of the nitrification tank N assigned to it. As an example, we assume that the first FIFO memory 10 comprises a number K of 100 memory locations. The volume unit assigned to a single memory location for a total liquid volume of, for example, 1000 m$^3$, between the measuring point 1 and the discharge of the nitrification tank results from the division of the total liquid volume by the number K of available memory units of 10 m$^3$.

In order to determine the air requirement value of a single volume unit currently passing the measuring point 1, the control unit sequentially captures throughput values measured by means of the flow sensor 10 until the throughput since capturing and saving the most recently determined air requirement value reaches a set throughput threshold value determined by the volume unit assigned to a memory location in the first FIFO memory 10. At the same time, the control unit continues to capture measuring values for the ammonium concentration provided by the first measuring point 1 and accumulates the measuring values captured since saving the last air requirement value until the throughput threshold value is reached. In our numerical example, the measuring values for the ammonium concentration captured, or values for the ammoniacal nitrogen load derived therefrom, are captured until a throughput of 10 m$^3$ since determining and saving the previous air requirement value is reached. The accumulation value formed by accumulating the ammonium concentration measuring values or the values representing the ammoniacal nitrogen load then serve to calculate the air requirement value 12 by means of the proportionality factor α. This air requirement value represents the air volume required in the nitrification tank N to degrade the ammoniacal nitrogen load of the volume unit that has most recently passed the measuring point 1. This air volume only needs to be fed into the nitrification tank N by means of the aerator 6 when the volume unit reaches the nitrification tank N.

The current air requirement value is written to the memory location j=k of the first FIFO memory 10, while simultaneously the oldest air requirement value saved to the memory location j=1 of the first FIFO memory 10 is deleted and all other values "move up one memory location" as described above.

This process is repeated for each volume unit flowing past the measuring point 1. In this way, the throughput determined by the flow sensor 10 sets a speed for new values to be written to the first FIFO memory 10 and for air requirement values already saved to be moved up in the given sequence of memory locations. The result is that each air requirement value that is freshly determined "flows" through the first FIFO memory 10 at a speed that corresponds to the flow velocity and/or the throughput of the liquid.

The n oldest air requirement values contained in the FIFO memory 10 are assigned to those volume units of the liquid that are currently found in the nitrification tank N, with the number n being the result of the division of the fluid volume contained in the nitrification tank N by the volume unit assigned to one memory location. FIG. 2 shows two vertical lines 13, 14 to illustrate this. Between said lines, the n memory locations of the FIFO memory 10 are arranged in which these n oldest air requirement values are saved. In order to determine a total air requirement value that represents the air volume that would have to be fed into the tank in order to degrade the entire ammoniacal nitrogen load that arrived in the nitrification tank N with the fluid volume that is currently contained in the nitrification tank N, those n oldest values contained in the FIFO memory 10 may be added up.

The control unit further comprises a second FIFO memory 15 that is designed in a similar way as the first FIFO memory 11 and in which air introduction values are saved that represent the actual air volume introduced into the liquid contained in the nitrification tank N by the aerator 6. The second FIFO memory 15 includes a number N of memory locations h=1, . . . , h=i, . . . , h=m, in which one air requirement value each may be stored. The memory locations of the second FIFO memory 15 are designed to be read in a logical sequence determined by the respective value of the index h to determine the sum of all values saved in the memory locations.

In the same time period in which the control unit sequentially captures throughput values measured by means of the flow sensor 10 until the throughput since the capturing and saving of the most recent air requirement value determined has reached the given throughput threshold value and simultaneously accumulates the measuring values captured since saving the last air requirement value, the control unit also sequentially captures throughput measuring values for the air introduced into the container by the aerator. Each of these throughput measuring values is evenly distributed to all memory locations of the second FIFO memory 15, i.e. an air volume percentage value, namely a quotient $$\frac{\Delta m}{N}$$

from the current throughput measuring value (air-mass flow $\Delta m$) and the number N of memory locations is assigned to each memory location. The air volume percentage values derived from the sequentially determined throughput measuring values are accumulated over the period between the time of saving the last air requirement value in the first FIFO memory 11 until the point in time at which the throughput values measured by the flow sensor 10 reach the throughput threshold value, and added as value increases to the air introduction values already contained in the memory locations of the second FIFO memory 15. All air introduction values contained in the memory locations of the second FIFO memory 15 are hence regularly updated at the speed of the first FIFO memory 11.

At the same time of saving a current air requirement value in the first FIFO memory 11 and deleting the oldest air requirement value in the first FIFO memory 11, the air introduction value that is saved at the first memory location h=1 according to the sequence set by the memory location indexes h=i is also deleted in the second FIFO memory 15. All other values move up according to the order determined by the indexes of the memory locations h=i to the memory location with the next higher index. In the last memory location h=n, the air introduction value is simultaneously set to zero. These steps all occur at a point in time that is determined by the throughput-dependent speed of the first FIFO memory. The number N of the memory locations of the second FIFO memory 15 corresponds to the number n of the air requirement values from the first FIFO memory 10 to be used for determining the total air requirement.

In order to determine the total air introduction value corresponding to the air volume already fed into the liquid found in the fluid tank, all air introduction values saved in the second FIFO memory 15 at a current point in time may be added.

The control unit uses the total air requirement value and the total air introduction value to determine a value for a reference variable that controls the aerator 6 which it passes to the air-mass flow control 16 of the aerator 6. For this purpose, it calculates the difference between the total air requirement value and the total air introduction value and derives from the requirement a current value for the reference variable. The value for the reference variable may also include another value that is determined by means of an additional control unit 17 based on an oxygen measurement in the nitrification tank N or based on a measurement of an ammonium concentration or ammoniacal nitrogen load at the second measuring point 2 in the liquid discharge of the nitrification tank N. Alternatively, the function of the control unit 17 may also be executed by the central control unit.

The air-mass flow control 16 is provided a current measuring value for an air volume introduced into the nitrification tank N by means of the aerator 6, e.g. an air-mass throughput value, as a control variable. Based on the respective current values for the reference and control variables, the control unit 16 determines the values for a regulating variable, e.g. a pump capacity or similar, which are passed on to the setting device 7 in order to adapt the air volume that is introduced to the identified requirements.

As mentioned above, the air requirement values are determined on the basis of values representing an ammoniacal nitrogen load and a proportionality factor $\alpha$. In one advantageous embodiment, measurements determined at the second measuring point 2 and representing an ammoniacal nitrogen load at the discharge may be used to adapt the proportionality factor $\alpha$ in order to be able to react to changes in the process in this way.

For this purpose, the ammoniacal nitrogen load at the second measuring point 2 can be subtracted from the ammoniacal nitrogen load at the first measuring point 1 and thus an ammoniacal nitrogen degrading value representing the ammoniacal nitrogen volume degraded can be determined. The degradation counter is designed to accumulate a plurality of sequentially determined degrading values, which in turn are calculated on the basis of a plurality of sequentially determined values representing the ammoniacal nitrogen load at the first measuring point 1 and a plurality of sequentially determined values representing the ammoniacal nitrogen load at the second measuring point 2. This accumulation may, for example, comprise a summation of values. Alternatively, it is also possible to first accumulate the values captured at the first measuring point 1 and at the second measuring point 2 respectively, and then calculate the difference between the accumulated values at a certain point in time in order to determine a degrading value for the ammoniacal nitrogen.

A dose counter in which the air volume introduced into the nitrification tank is accumulated also is used to determine the proportionality factor $\alpha$. For this purpose, values representing the air volume introduced, e.g. measuring values from the flow sensor 8 or values depending on those values may be accumulated, especially added, in the dose counter.

At a certain point in time, either at the end of a preset time period, e.g. saved in the control unit, or upon input on the part of an operator at the control unit, the proportionality factor $\alpha$ is determined from the current counter readings, e.g. as a quotient from the counter value of the degrading counter and the counter value of the dose counter, wherein, if necessary, depending on the values accumulated in the respective counters, other factors for the adaption of the respective physical units of the counter values must be taken into account. It is advantageous if the time period during which the accumulation of the incoming values in the counters occurs is much longer than the period that one volume unit of the liquid flowing through the plant requires to get from the first measuring point 1 to the second measuring point 2.

Advantageously, the proportionality factor α that was the last to be determined may be used for the further identification of air requirement values and saved in the control unit instead of the proportionality factor previously saved in the control unit and used by the latter to determine air requirement values. Thanks to the regular determination of an adapted proportionality factor α and the adaption of the proportionality factor used by the control unit in such a way that the control unit applies the most recent value for α that has been identified to determine the air requirement values, it is ensured that a proportionality factor α that is adapted to the actual ammoniacal nitrogen degradation is always used.

There are several conceivable options for the adaption of the proportionality factor α. It may, for example, be provided for that the counters are manually reset by an operator and the newly determined proportionality factor α is saved by manual input from an operator instead of the previous proportionality factor. An extension is also conceivable that regularly executes a new calculation of α based on the values captured during a moving, preset period of time, e.g. moving averages of the values captured in the counters.

The invention claimed is:

1. A method to control a process variable representing an air volume to be fed into a liquid volume inside a container including a fluid intake and a fluid discharge in a process for treating the liquid, said process being conducted in the container and said method being performed using an air-mass flow controller and comprising the steps:
   measuring values of a first measurand representing a load of one or more substances to be degraded in the process and found in a settable volume unit of the liquid in the fluid intake;
   sequentially determining values of a reference variable to be supplied to the air-mass flow controller based on the values of the first measurand, said reference variable representing a nominal value of the air volume to be fed into the liquid volume;
   sequentially determining values of a regulating variable using both values for the reference variable and sequentially determined values of the process variable, said regulating variable being a variable for an aerator that serves to supply air into the liquid volume in the container and said variable influencing the air volume fed into the liquid volume using the aerator; and
   determining a current value for the reference variable by:
      sequentially saving values of the first measurand, or values derived therefrom, in a first FIFO memory having a number K of memory locations for saving one value respectively, namely a memory featuring a number K of logically consecutive memory locations (j=i) in such a way that the oldest value saved in the first FIFO memory is saved in a first memory location (j=1) and the value saved last in the first FIFO memory is saved in a final memory location (j=k);
      using only the n oldest values saved in the first FIFO memory to determine the current value for the reference variable, with n being a number of values that is smaller than the number K of the values saved in the memory locations of the first FIFO memory and greater than or equal to 1; and
   adjusting the aerator using the air-mass flow controller using the values of the regulating variable;
   wherein the values of the first measurand or air requirement values derived from at least one value of the first measurand using a proportionality factor are saved sequentially in the first FIFO memory, and each air requirement value represents an air volume to be fed into the liquid to degrade the substance load represented by the at least one value of the first measurand.

2. The method according to claim 1, wherein:
   sequentially determining values of the reference variable to be provided to the air-mass flow controller further comprises measuring values of a second measurand that differs from the first measurand, said values being used to determine the reference variable.

3. The method according to claim 2, further comprising:
   determining the current value for the reference variable by sequentially saving values for the second measurand, or values derived therefrom, in a second FIFO memory having a number N of memory locations for saving one value respectively, namely a memory featuring a number N of logically consecutive memory locations (h=I), and by using all the values saved in the second FIFO memory to determine the current value for the reference variable, with N being a number of values that is equal to the number n of the values saved in the first FIFO memory and used for determining the current value of the reference variable.

4. The method according to claim 1, wherein:
   the regulating variable is a pump capacity or a rotational speed.

5. The method according to claim 4, further comprising:
   sequentially measuring values of a third measurand, which represent the remaining quantity of the substance to be degraded in the process and discharged from the container via the fluid discharge, or a dissolved oxygen content found in the liquid in the container.

6. The method according to claim 5, further comprising:
   using the values of the third measurand for determining the values of the reference variable.

7. The method according to claim 1, wherein:
   several values for the first measurand and a throughput of the liquid are measured sequentially to determine each air requirement value;
   with the sequentially measured values for the first measurand or values derived therefrom being accumulated until the throughput reaches a settable throughput threshold value; and
   the air requirement value is determined by the accumulation value resulting from the accumulation of values of the first measurand using the proportionality factor.

8. The method according to claim 7, wherein:
   with the respective air requirement value determined most recently being saved to a memory location in the first FIFO memory, the oldest air requirement value saved in the first FIFO memory is simultaneously deleted or overwritten.

9. The method according to claim 7, wherein:
   the values of the first measurand are measured at a measuring point arranged in the fluid intake, and wherein the settable throughput threshold value equals the quotient of the volume taken up by the liquid found between the measuring point and the fluid discharge, and the number K of the memory locations of the first FIFO memory, so that each memory location corresponds to a liquid volume unit flowing into the container by the way of the fluid intake, and the air requirement value saved in that memory location represents the air volume to be supplied into the liquid in order to degrade the load contained in this liquid volume unit.

10. The method according to claim 9, wherein:
to obtain the current value of the reference variable to be supplied to the air-mass flow controller, the n oldest requirement values saved in the first FIFO memory are added to obtain a total air requirement value; and
the number n of the air requirement values being used for the total air requirement value is selected in such a way that the sum of the liquid volume units corresponding to the respective memory locations is equal to the volume of the container comprising the liquid.

11. The method according to claim 7, wherein:
the second measurand represents an air volume introduced into the liquid in the container using the aerator; and
the method further comprises determining air introduction values from several sequentially captured values of the second measurand by accumulating the sequentially captured values of the second measurand or values derived therefrom until the liquid throughput detected for the simultaneous determination of an air requirement value has reached the settable throughput threshold values, and the air introduction values are determined by accumulation values obtained by the accumulation of the values of the second measurand or the values derived therefrom.

12. The method according to claim 11, wherein:
at the same time that a newly determined air requirement value is saved, and the oldest air requirement value in the first FIFO memory is deleted, the air introduction value saved in the second FIFO memory at a first memory location according to the logical sequence of the memory locations (h=1) is deleted as well.

13. The method according to claim 12, wherein:
to obtain the current value of the reference variable to be supplied to the air-mass flow controller, all air introduction values saved in the second FIFO memory are added to obtain a total air introduction value.

14. The method according to claim 13, wherein:
in order to determine the current value for the reference variable, a deviation value representing the deviation of the total air requirement value from the total air introduction value is determined.

15. A method to control a process variable representing an air volume to be fed into a liquid volume inside a container including a fluid intake and a fluid discharge in a process for treating the liquid, said process being conducted in the container and said method being performed using an air-mass flow controller and comprising the steps:
measuring values of a first measurand representing a load of one or more substances to be degraded in the process and found in a settable volume unit of the liquid in the fluid intake;
sequentially determining values of a reference variable to be supplied to the air-mass flow controller based on the values of the first measurand, said reference variable representing a nominal value of the air volume to be fed into the liquid volume;
sequentially determining values of a regulating variable using both values for the reference variable and sequentially determined values of the process variable, said regulating variable being a variable for an aerator that serves to supply air into the liquid volume in the container and said variable influencing the air volume fed into the liquid volume using the aerator, wherein the regulating variable is a pump capacity or a rotational speed;
determining a current value for the reference variable by:
sequentially saving values of the first measurand, or values derived therefrom,
in a first FIFO memory having a number K of memory locations for saving one value respectively, namely a memory featuring a number K of logically consecutive memory locations (j=i) in such a way that the oldest value saved in the first FIFO memory is saved in a first memory location (j=1) and the value saved last in the first FIFO memory is saved in a final memory location (j=k); and
using only the n oldest values saved in the first FIFO memory to determine the current value for the reference variable, with n being a number of values that is smaller than the number K of the values saved in the memory locations of the first FIFO memory and greater than or equal to 1;
sequentially measuring values of a third measurand, which represent the remaining quantity of the substance to be degraded in the process and discharged from the container via the fluid discharge, or a dissolved oxygen content found in the liquid in the container;
using the values of the third measurand for determining the values of the reference variable;
deriving from the values of the third measurand nominal values by means of a second control unit and using the nominal values in the step of sequentially determining values of the reference variable to be supplied to the air-mass flow controller;
adjusting the aerator using the air-mass flow controller using the values of the regulating variable.

16. The method according to claim 15, wherein:
the second control unit is an output control that is supplied with the values of the third measurand measured downstream from the liquid discharge as a process variable to be controlled by the second control unit, and said second control unit determines values of a variable representing an air volume to be introduced into the container and serving as the regulating variable of the second control unit, said second control unit determining the values of said regulating variable based on a comparison of the process variable with a fixed reference variable; and
wherein the values of the regulating variable of the second control unit are used in the step of sequentially determining values of the reference variable to be supplied to the air-mass flow controller.

17. A method to control a process variable representing an air volume to be fed into a liquid volume inside a container including a fluid intake and a fluid discharge in a process for treating the liquid, said process being conducted in the container and said method being performed using an air-mass flow controller and comprising the steps:
measuring values of a first measurand representing a load of one or more substances to be degraded in the process and found in a settable volume unit of the liquid in the fluid intake;
sequentially determining values of a reference variable to be supplied to the air-mass flow controller based on the values of the first measurand, said reference variable representing a nominal value of the air volume to be fed into the liquid volume;

sequentially determining values of a regulating variable using both values for the reference variable and sequentially determined values of the process variable, said regulating variable being a variable for an aerator that serves to supply air into the liquid volume in the container and said variable influencing the air volume fed into the liquid volume using the aerator;

determining a current value for the reference variable by:
sequentially saving values of the first measurand, or values derived therefrom, in a first FIFO memory having a number K of memory locations for saving one value respectively, namely a memory featuring a number K of logically consecutive memory locations (j=i) in such a way that the oldest value saved in the first FIFO memory is saved in a first memory location (j=1) and the value saved last in the first FIFO memory is saved in a final memory location (j=k); and using only the n oldest values saved in the first FIFO memory to determine the current value for the reference variable, with n being a number of values that is smaller than the number K of the values saved in the memory locations of the first FIFO memory and greater than or equal to 1;

adjusting the aerator using the air-mass flow controller using the values of the regulating variable;

deriving air requirement values from at least one value of the first measurand using a proportionality factor, and sequentially saving the air requirement values into the first FIFO memory;

measuring at least one value of a third measurand in the discharge or downstream of the discharge; and adapting the proportionality factor based on said at least one value of the third measurand;

wherein the regulating variable is a pump capacity or a rotational speed.

18. The method according to claim 17, wherein:
the adapting of the proportionality factor includes:
measuring values of the first measurand at the intake or upstream from the intake during a given time period;

determining from said values of the first measurand a load of substances to be degraded that has been added to the process during the given time period;

measuring values of the third measurand at the discharge during the given time period, determining from said values of the third measurand a load of substances to be degraded that leaves the process by the discharge in this time period from said measuring values of the third measurand;

determining deviation values which represent a deviation from the load of substances to be degraded added to the process from the load of substances to be degraded that leave the process at the discharge; and using the deviation values and values for the air volume introduced into the container in the given time period for adapting the proportionality factor.

19. A device comprising:
an aerator configured to supply air into a liquid volume in a container, said container having a fluid inlet and a fluid discharge;

an air mass flow controller configured to control the aerator;

a first measuring unit serving to measure values of a first measurand representing a load of one or several substances to be degraded in the process and found in a settable volume unit of the liquid in the fluid intake, said first measuring unit being arranged in the fluid intake or upstream from the fluid intake; and an electronic control unit connected with the first measuring unit to receive the measuring values from the first measuring unit, which comprises an operating software configured to:
sequentially determine values of a reference variable to be supplied to the first measuring unit based on the values of the first measurand, said reference variable representing a nominal value of the air volume to be fed into the liquid volume;

sequentially determine values of a regulating variable using both values for the reference variable and sequentially determined values of a process variable, said regulating variable being a variable for the aerator influencing the air volume fed into the liquid volume by means of the aerator, said process variable represents an air volume to be fed into a liquid volume inside a container including a fluid intake and a fluid discharge in a process for treating the liquid;

with a current value for the reference variable being determined by sequentially saving values of the first measurand, or values derived therefrom, in a first FIFO memory having a number K of memory locations for saving one value respectively, namely a memory featuring a number K of logically consecutive memory locations (j=i) in such a way that the oldest value saved in the first FIFO memory is saved in a first memory location (j=1) and the value saved last in the first FIFO memory is saved in a final memory location (j=1); and by using only the n oldest values saved in the first FIFO memory to determine the current value for the reference variable, with n being a number of values that is smaller than the number K of the values saved in the memory locations of the first FIFO memory and greater or equal 1, and adjusting the aerator by means of the air-mass flow controller;

the values of the first measurand or air requirement values derived from at least one value of the first measurand using a proportionality factor are saved sequentially in the first FIFO memory; and each air requirement value represents an air volume to be fed into the liquid to degrade the substance load represented by the at least one value of the first measurand.

20. A method to control a process variable in a process using a control unit, the process being conducted in a container, the method comprising the steps of:
measuring values of a first measurand, wherein the values of the first measurand represent a load of one or more substances to be degraded in the process and found in a settable volume unit of liquid in a fluid intake of the container;

sequentially determining values of a reference variable to be supplied to the control unit based on the values of the first measurand;

sequentially determining values of a regulating variable using both values for the reference variable and sequentially determined values of the process variable, wherein the regulating variable represents a variable for an aerator that serves to supply air into the liquid volume of the container and said variable influencing the air volume fed into the liquid volume using the aerator, wherein the process variable represents an air volume to be fed into a liquid volume inside a container including a fluid intake and a fluid discharge in a process for treating the liquid;

determining of a current value for the reference variable by:

sequentially saving values of the first measurand, or values derived therefrom, in a first FIFO memory having a number K of memory locations for saving one value respectively, namely a memory featuring a number K of logically consecutive memory locations (j=i) in such a way that the oldest value saved in the first FIFO memory is saved in a first memory location (j=1) and the value saved last in the first FIFO memory is saved in a final memory location (j=k);

using only the n oldest values saved in the first FIFO memory to determine the current value for the reference variable, with n being a number of values that is smaller than the number K of the values saved in the memory locations of the first FIFO memory and greater than or equal to 1; and sequentially saving values of a second measurand, or values derived therefrom, in a second FIFO memory having a number N of memory locations for saving one value respectively, namely a memory featuring a number N of logically consecutive memory locations (h=1);

using all the values saved in the second FIFO memory to determine the current value for the reference variable, with N being a number of values that is equal to the number n of the values saved in the first FIFO memory and used for determining the current value of the reference variable; and adjusting the aerator using the air-mass flow controller using the values of the regulating variable.

\* \* \* \* \*